(12) United States Patent
Tatem et al.

(10) Patent No.: US 9,657,891 B1
(45) Date of Patent: May 23, 2017

(54) BRACKET FOR MOUNTING A USER RECEIVING DEVICE

(71) Applicant: The DIRECTV Group, Inc., El Segundo, CA (US)

(72) Inventors: Richard B. Tatem, Middletown, MD (US); Sayedalireza Pezeshki, Chevy Chase, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 14/447,150

(22) Filed: Jul. 30, 2014

(51) Int. Cl.
*A47F 5/00* (2006.01)
*F16M 13/02* (2006.01)

(52) U.S. Cl.
CPC .................... *F16M 13/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,347,505 A | * | 10/1967 | Menser | 248/68.1 |
| 3,989,398 A | * | 11/1976 | Wendt | 403/230 |
| 5,574,256 A | * | 11/1996 | Cottone | 174/53 |
| 5,995,364 A | * | 11/1999 | McAnally et al. | 361/679.31 |
| 6,158,180 A | * | 12/2000 | Edwards | E04B 2/7422 174/481 |
| 6,766,992 B1 | * | 7/2004 | Parker | 248/300 |
| D625,168 S | * | 10/2010 | Chen | D8/354 |
| 7,866,621 B1 | * | 1/2011 | Walters | 248/421 |
| 7,997,549 B2 | * | 8/2011 | Hopkins | 248/220.41 |
| 8,011,628 B1 | * | 9/2011 | Suddeth | 248/225.11 |
| 8,094,438 B2 | * | 1/2012 | Dittmer et al. | 361/679.01 |
| 8,167,257 B2 | * | 5/2012 | Beauvais | 248/200.1 |
| 8,720,844 B2 | * | 5/2014 | Westimayer et al. | 248/475.1 |
| 8,891,249 B2 | * | 11/2014 | Stanek et al. | 361/810 |
| 8,907,862 B2 | * | 12/2014 | Lettkeman | 343/878 |
| 8,979,043 B2 | * | 3/2015 | Florman | F21V 21/00 248/152 |
| 2003/0155474 A1 | * | 8/2003 | Dean et al. | 248/300 |
| 2004/0074196 A1 | * | 4/2004 | Saladana | 52/712 |
| 2005/0098510 A1 | * | 5/2005 | Lom et al. | 211/13.1 |
| 2005/0127260 A1 | * | 6/2005 | Dittmer | 248/221.11 |
| 2005/0258323 A1 | * | 11/2005 | Lin | 248/278.1 |
| 2006/0237601 A1 | * | 10/2006 | Rinderer | 248/200.1 |
| 2007/0007414 A1 | * | 1/2007 | Matsuda et al. | 248/298.1 |
| 2008/0252798 A1 | * | 10/2008 | Vitito | 348/837 |
| 2012/0320506 A1 | * | 12/2012 | Bentz et al. | 361/679.01 |
| 2013/0206944 A1 | * | 8/2013 | Merck et al. | 248/309.1 |
| 2015/0097348 A1 | * | 4/2015 | Steinfels et al. | 280/47.35 |

* cited by examiner

*Primary Examiner* — Monica Millner
(74) *Attorney, Agent, or Firm* — Harness, Dickey & Pierce, PLC (57) ABSTRACT

A mounting bracket mounting to a mounting surface includes a back plate having a first side and second side. The second side is adjacent to the mounting surface. A shelf portion extends outward from the first surface of the back plate. A retainer portion extends from the shelf portion.

19 Claims, 13 Drawing Sheets

BRACKET FOR MOUNTING A USER RECEIVING DEVICE

RELATED DISCLOSURES

This Application is related to U.S. Application Nos. (29/497,990, 29/497,996 and 29/497,998) filed concurrently herewith, the disclosures of which are incorporated herein by reference.

TECHNICAL FIELD

The present disclosure relates generally to satellite television receiving device, and, more specifically, to a bracket for mounting the devices on or near a display or television.

BACKGROUND

The statements in this section merely provide background information related to the present disclosure and may not constitute prior art.

To facilitate satellite broadcast service for a residential subscriber, a satellite service provider installs one or more "satellite dish" antennas at the subscriber's residence. The satellite dish is positioned to provide an unobstructed line-of-sight (LOS) with the satellite service provider's satellite(s) for signal reception. For rural or suburban single-family residences, the satellite dish will commonly be placed on the roof, attached to an exterior wall with appropriate (e.g., southern) exposure, or mounted on a pole in the yard, as long as line of sight with the satellite is not obstructed by trees, mountains or other structures.

For potential subscribers in more urban, higher-density housing environments, such as "multi-dwelling units" (MDU) in which individual housing units for residents or tenants are contained within one building or several buildings within one complex (e.g., apartments, condominiums, office suites, commercial and hotels), the provision of individual satellite dishes to each subscriber may be impractical or even prohibited. Not all residents of multi-dwelling units have an exterior wall or balcony with appropriate exposure, and those that do may be blocked by adjacent structures. Additionally, building codes and community rules (e.g., condominium association rules) may restrict the use of satellite dishes.

To address these issues, satellite service providers may install local content distribution systems within hotels and large multi-dwelling units to service multiple units/subscribers from a single satellite dish resource. Typical installations also include a set top box or a client unit for each television display. The television displays may be located in various locations. However, it may be desirable to pre-wire a multiple-dwelling unit. Typically, a set top box is placed in a customer's existing furniture. However, in a pre-wired installation, furniture does not typically exist for placing a set top box therein. Further, such installations are not secure for retaining the set top box. That is, a customer may easily remove the set top box from the premises.

SUMMARY

The present disclosure provides a mounting bracket for securing a user receiving device such as a set top box or set back box to a television or within the building structure itself. The present example is particularly suitable for multiple-dwelling units (MDU's), but may also be used for other types of residential or commercial applications.

In one aspect of the disclosure, a mounting bracket mounting to a mounting surface includes a back plate having a first side and second side. The second side is adjacent to the mounting surface. A shelf portion extends outward from the first surface of the back plate. A retainer portion extends from the shelf portion.

In another aspect of the disclosure, an assembly includes a mounting bracket as described above. The mounting bracket comprising an extension disposed along a lateral edge of the back plate. The assembly further comprises an enclosure enclosing the mounting bracket and coupled to the extension.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

Figure 1:
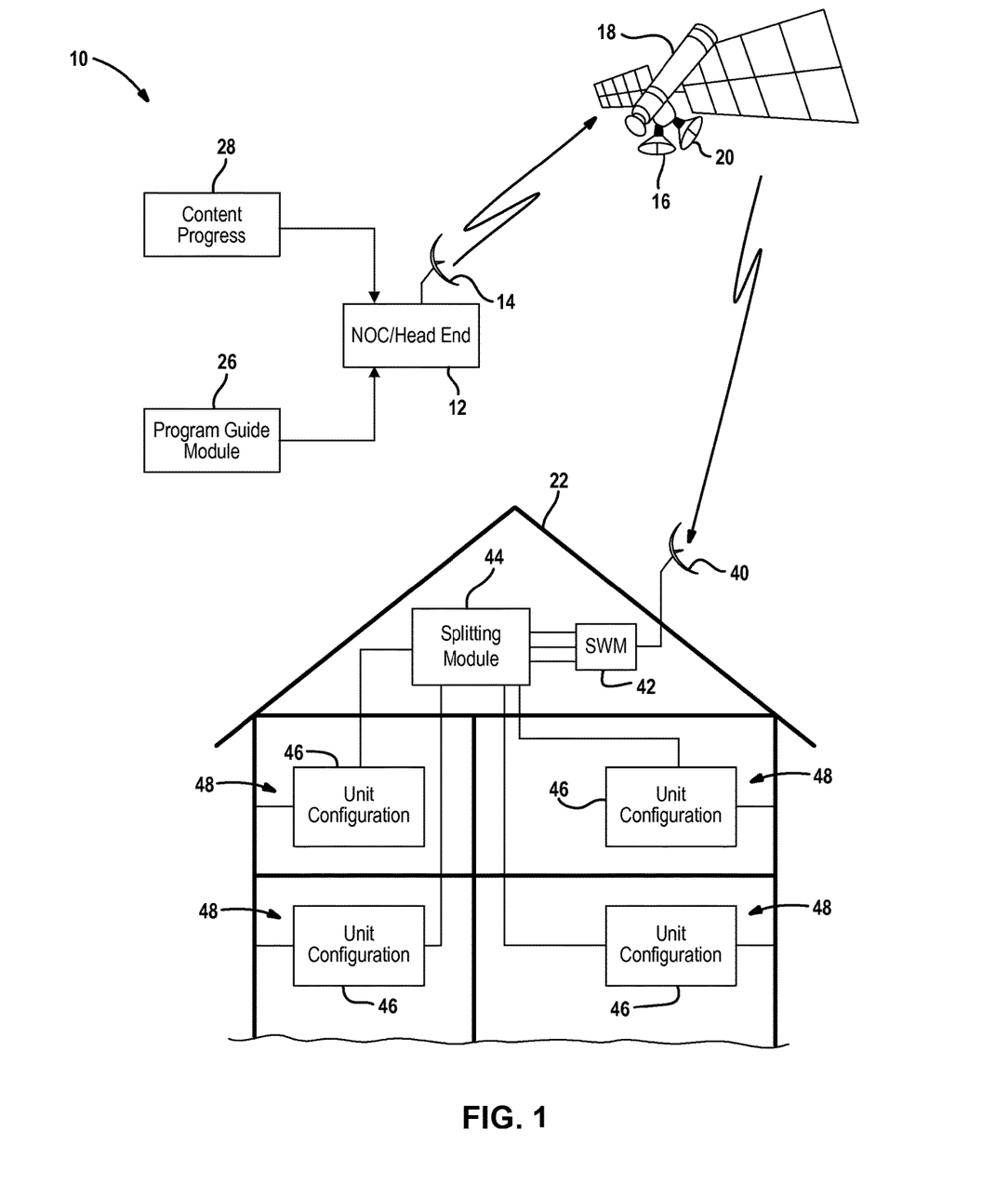
FIG. 1 is a high level block diagrammatic view of a content distribution system such as a satellite television broadcasting system.

Referring now to FIG. 1, a satellite television broadcasting system 10 is illustrated. The satellite television broadcasting system 10 includes an operational headend or network operations center (NOC) 12 that generates wireless uplink signals through a transmitting antenna 14 which are received by a receiving antenna 16 of a satellite 18. The wireless signals, for example, may be digital and in a first format used for satellite communications. A transmitting antenna 20 generates wireless downlink signals directed to various receiving systems including stationary systems such as those in a building 22 or property with multiple buildings. The building 22 may be a multiple dwelling unit (MDU) which individual unit configurations are desirable.

The wireless signals may have various types of data associated with them including various channel information such as a channel or program guide, metadata, location information and the like. The guide data may be received from the network operations center 12 or external headend. The wireless signals may also have various video and audio signals associated therewith.

The program guide data may be received from a program guide module 26. The program guide module 26 may communicate various objects to the network operations center 12. Various types of data may be communicated about the programming and grid guide including the channel number, a network identifier, program data such as a start and end time of airing, title, numerical identifier, content data such as actors, descriptions, ratings and the like. Program guide data may include the relative positions of the data, the line structures for forming the grid for the program guide and the like.

A content provider 28 may provide content to the network operations center 12. The content provider 28 may include various television networks that provide programming and content for a particular channel as well as on-demand and pay-per-view providers that provide content for communication at particular times over channels specified at the network operations center 12.

Building 22 includes a receiving antenna (e.g., satellite dish) 40 that receives the wireless signals from the satellite 18. Although only one antenna 40 is illustrated, more antennas may be provided.

The antenna or plurality of antennas 40 are in communication with a single-wire multi-switch (SWM) module 42. As will be described below, more than one single-wire multi-switch may be included within a system. The single-wire multi-switch module 42 is used to multiplex signals on one or more outputs. In some embodiments, the multiplexed output signals may have frequencies designated for use by particular user receiving device tuners within building 22.

A splitting module 44 is in communication with the single-wire multi-switch module 42. The splitting module 44 may split the channel signals for distribution to various unit configurations 46. Each unit configuration 46 corresponds to a user receiving device configuration within each of the individual units 48 within the building 22. The splitting module 44 and unit configuration 46 are described further below. By way of example, four individual units 48 are illustrated, each having a respective unit configuration 46.

Figure 2:
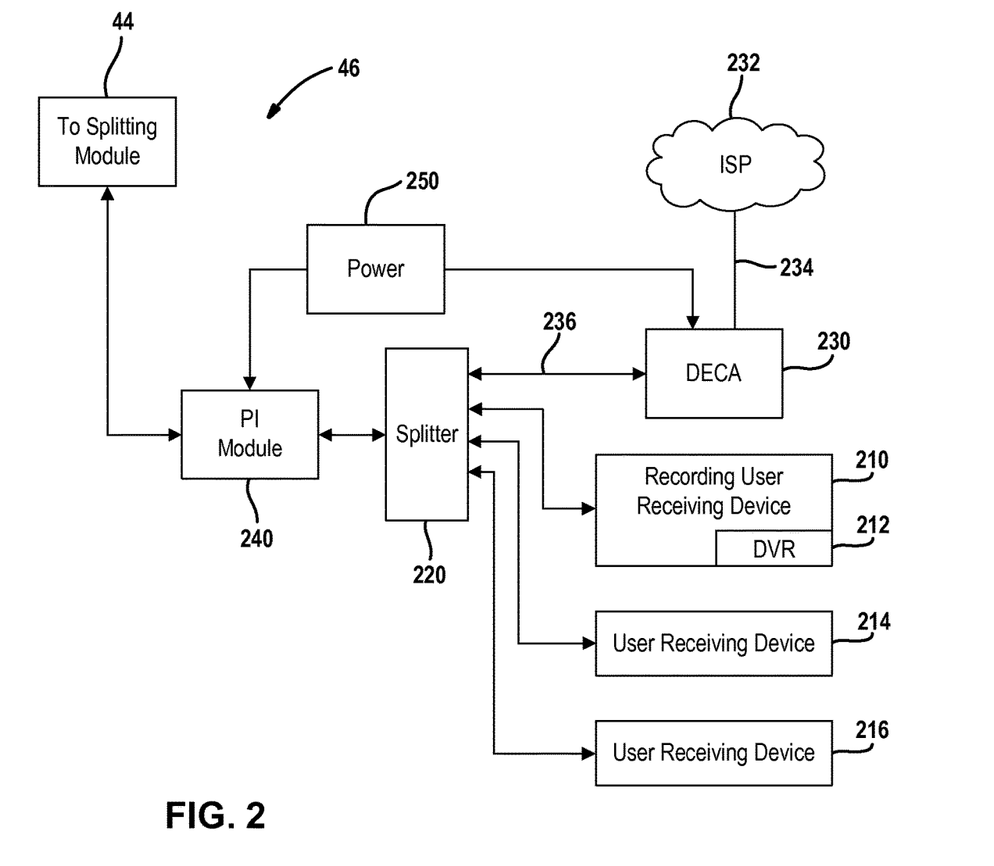
FIG. 2 is a block diagrammatic view of an example of the unit configuration of FIG. 1.

Referring now to FIG. 2, one example for a unit configuration 46 is set forth. As will be described further below, various numbers of user receiving devices may be used. In this example, a first user receiving device is a recording user receiver device 210. A digital video recorder is provided as an example of a memory used for recording content. The digital video recorder 212 may comprise a hard drive or other types of chip-based memory such as FLASH memory. The user receiving device 210 may be used for receiving satellite signals or terrestrial over the air signals. Further, the user receiving device 210 may be used for receiving cable television signals. Of course, it should be noted that various numbers of recording user receiving devices 210 and user receiving devices 214, 216 may be used in a particular configuration. Each of the recording user devices 210 and the user receiving devices 214, 216 may be in communication with a splitter 220. The splitter 220 ultimately receives signals from the splitting module 44. One or more of the user receiving devices 210, 214, 216 may be secured to a display or wall using the brackets described in detail below.

In some embodiments, a DIRECTV® Ethernet Coaxial Adapter (DECA) 230 may be in communication with an internet service provider 232 (e.g., via an Ethernet router, gateway, broadband modem and/or other Internet access device) and the splitter 220. Between the ISP 232 and DECA a category 5 cable 234 may be used. Of course, other suitable IP cables may be used. The DECA 230 is used to convert the internet service provider signals into a coaxial format (e.g., Multimedia Over Coaxial Alliance MOCA®) for communication to the splitter 220 through a coaxial cable 236. The coaxial cable may be, for example, RG6 or RG11 depending on the distance. RG11 may be more suitable for longer distances. The splitter 220 may distribute the internet signals to the recording user receiving device 210 and the user receiving devices 214, 216. Likewise, signals from the recording user receiving device 210 and the user receiving devices 214, 216 may be communicated to the splitter 220 and ultimately to the internet service provider 232 through the DECA 230.

A power injection (PI) module 240 may be used to inject power onto the cable from the splitting module 44. A relatively low power such as 29 watts may be provided to the splitting module 44. Both channel signals and power may thus occupy the same cable.

The PI module 240 is powered from a power source 250 (e.g., an AC/DC adapter/converter plugged into a wall socket of the housing unit), which may also be used to power DECA 230. (Although not illustrated, the recording user receiving device 210, the user receiving device 214 and the user receiving device 216 are also coupled to a power source).

The cable connections between the splitter 228 and the user receiving devices 210, 214, 216 and the splitter 220 and the splitting module 44 may all be coaxial cable.

Figure 3:
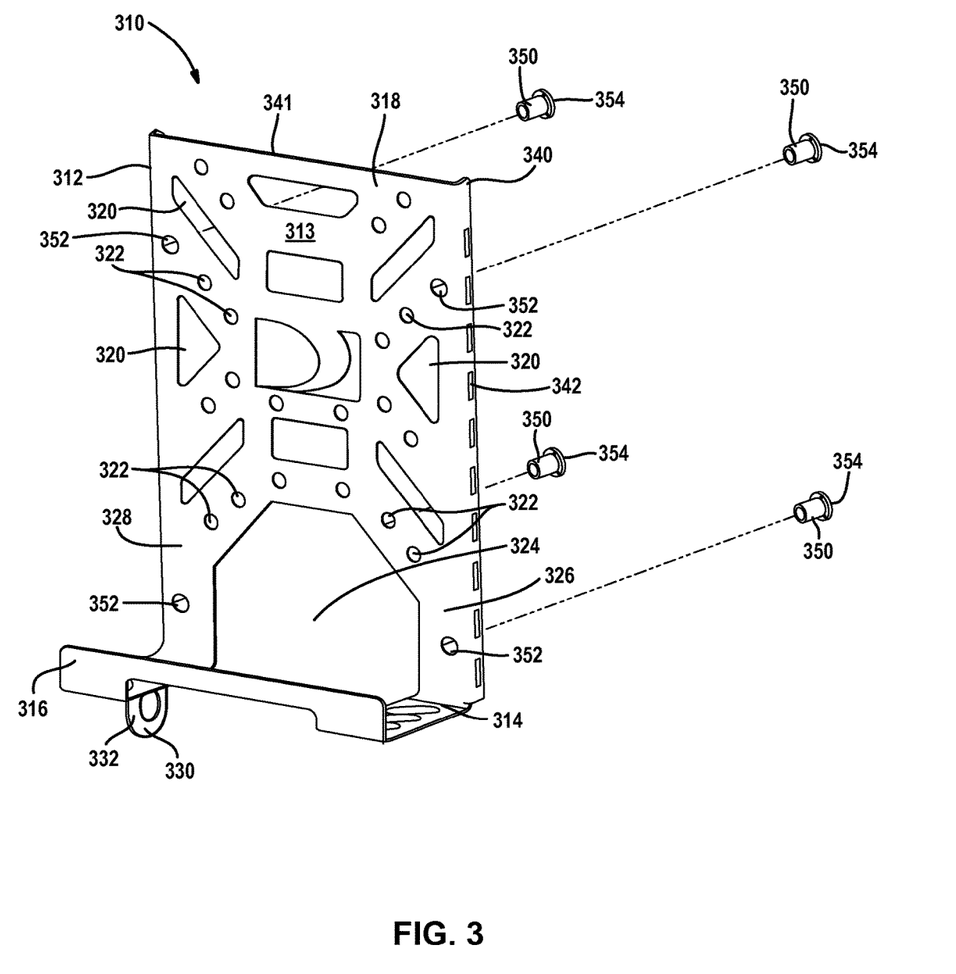
FIG. 3 is a perspective view of a first example of a mounting bracket.

Referring now to FIG. 3, a first example of a mounting bracket 310 for mounting the user receiving device 210, 214 or 216 of FIG. 2 is set forth. In this example, the mounting bracket 310 includes a back plate 312, a shelf portion 314 and a retainer portion 316. The back plate 312 is generally planar. The back plate 312 has a first side 318 as illustrated in FIG. 3. The first side 318 may have a plurality of openings 320 disposed therein. The openings 320 may be used to allow airflow around the bracket 310. The first side 318 of back plate 312 may also include a plurality of mounting holes 322. The mounting holes 322 may be disposed at various locations on the back plate 312. A combination of mounting holes 322, such as four mounting holes, may be spaced according to a standard such as the Video Electronics Standard Association (VESA). The VESA standard sets forth predetermined spacings that are included in many display units.

The back plate 312 may be disposed parallel to a mounting surface on the back of a display such as a television or monitor as will be illustrated below. In the present example, the back plate 312 is disposed in a vertical plane.

The back plate 312 may have an opening 324 that is defined by two fingers 326 and 328 that extend from a main body 313 of the back plate 312.

A shelf portion 314 extends from the back plate 312 outwardly away from the surface to which the mounting bracket 310 is mounted. The shelf portion 314, in this example, extends in a perpendicular direction to the main body of the back plate 312. The shelf portion 314 may be formed from extensions of the fingers 326 and 328.

The retainer portion 316 extends from the shelf portion 314 and is coupled to the fingers 326, 328. In this example, the shelf portion 314 is perpendicular, or normal, to a plane of the back plate 312. The retainer portion 316 may be perpendicular, or normal, to the shelf portion 314. The retainer portion 316 may thus be parallel to the back plate 312. A portion of fingers 326 and 328 may form part of the retainer portion.

A cable retainer 330 may extend from the shelf portion, retainer portion or the back plate 312. The cable retainer 330, in this example, extends from the shelf portion 314 in a direction perpendicular to both the plane of the shelf portion 314 and the plane of the back plate 312.

The cable retainer 330 has an opening 332 therethrough. The opening 332 may be sized to retain a cable that extends from the set top box to a display device such as a television. The opening 332 may be sized so that a connection on the cable cannot be removed therethrough. The connector would be installed by a technician after the cable is inserted through the opening 332.

The mounting bracket 310 may be formed of metal. In one example, the mounting bracket 310 is formed of aluminum. Metal increases the heat sinking properties of the bracket 310.

Figure 6A:
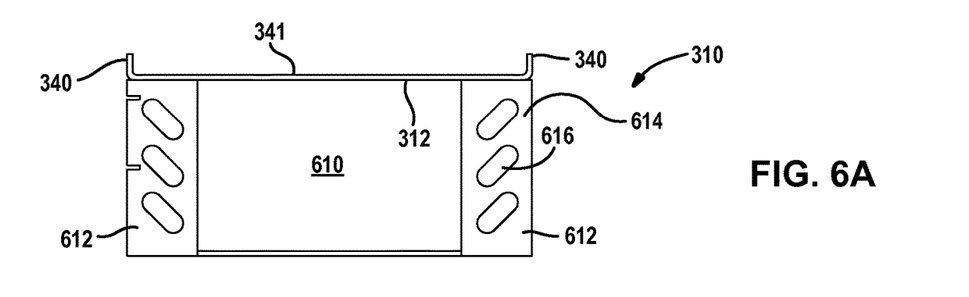
FIG. 6A is a top view of the bracket of FIG. 3.
Figure 6B:
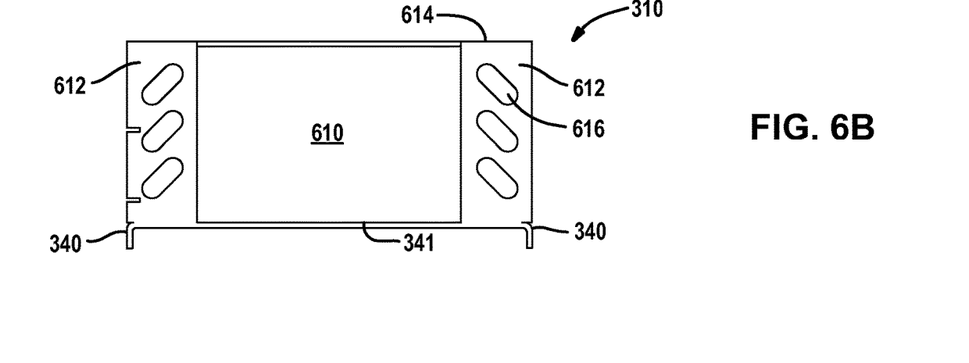
FIG. 6B is a bottom view of the bracket of FIG. 3.

A pair of mounting extensions 340 extend from longitudinal edges of the second side 341 of the mounting bracket 310 illustrated better in FIGS. 6A and 6B. As illustrated, the edges and thus the mounting extensions 340 are vertical. The mounting extensions 340 may have slots 342 therethrough. The slots 342 allow a retainer (illustrated in FIG. 4) to extend therethrough to secure the set top box or user receiving device to the mounting bracket 310.

A plurality of standoffs 350 may be mounted through hole 352 in the second side 341 and extend out of the first side of the back plate 312. The standoffs 350 urge the user receiving device retained by the mounting bracket toward the retainer portion 316 to allow air to flow around the user receiving device for cooling. The size of the standoff 350 may vary depending upon the size of the user receiving device. The standoffs 350 may be made from a pliable material such as rubber or plastic.

Figure 4:
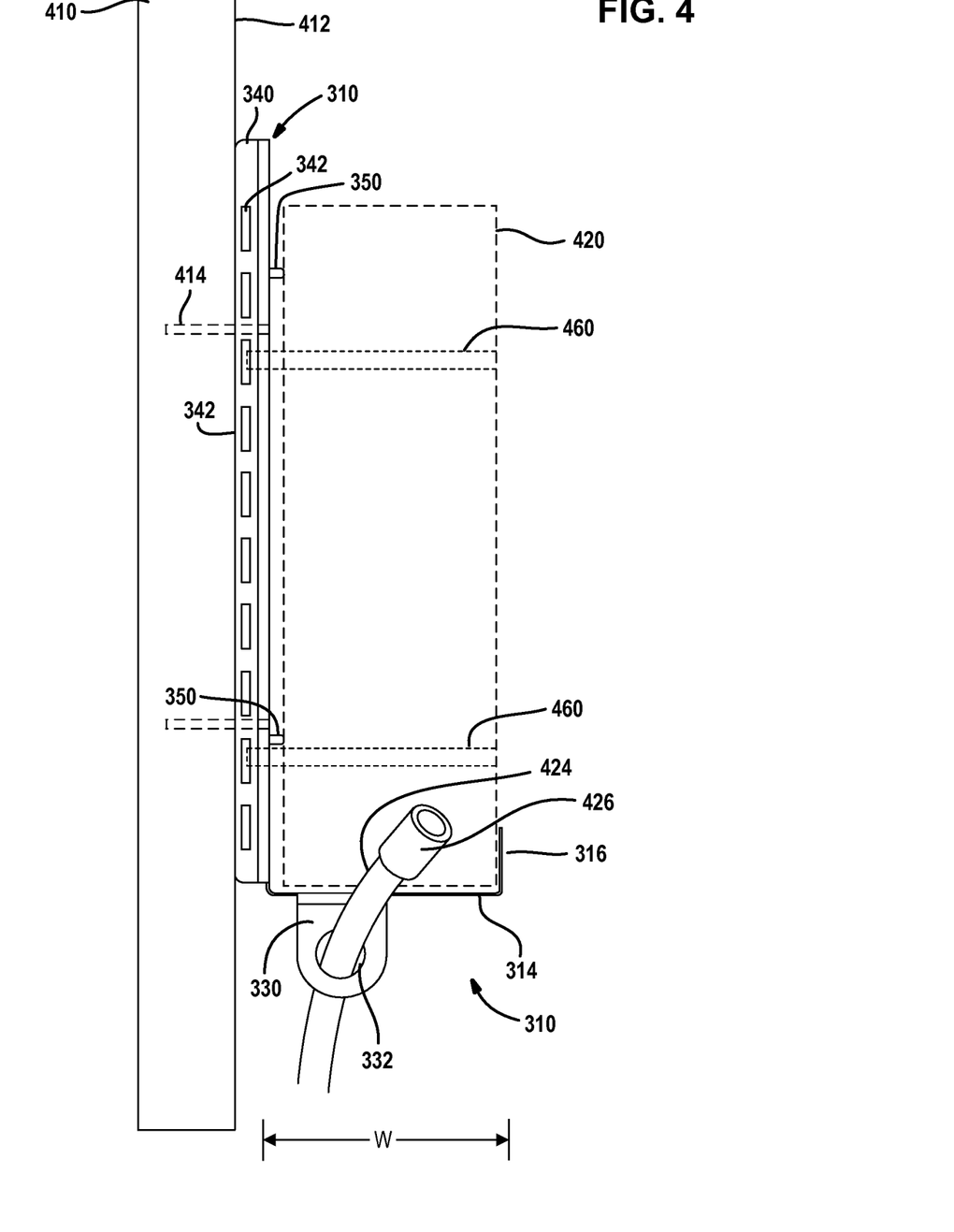
FIG. 4 is a side view of the mounting bracket of FIG. 3.

Referring now to FIG. 4, a display 410 having a back wall 412 has the mounting bracket 310 fastened thereto. Screws or other types of fasteners 414 may extend into the display 410. As mentioned above, the fasteners 414 may be in a predetermined pattern aligned with the standards such as the VESA standard. The shelf portion 314 may have a width W that is sized to receive the user receiving device 420.

A cable 424 extends through the opening 332 of the cable retainer 330. A connector 426 on the cable may have a diameter greater than the opening 332 to thwart removal. The connector 426 may also be tamper proof so that it cannot be easily removed or disconnected from the user receiving device 420.

The slots 342 of the mounting extensions 340 allow a fastener 460 to secure to the user receiving device 420. The user receiving device 420 may be secured by various types of fasteners such as a strap or tie wrap. In this example, a tie wrap is illustrated. The fastener 460 may extend around the user receiving device 420 and through slots 342 in each mounting extension. More than one fastener 460 may be used.

Figure 5:
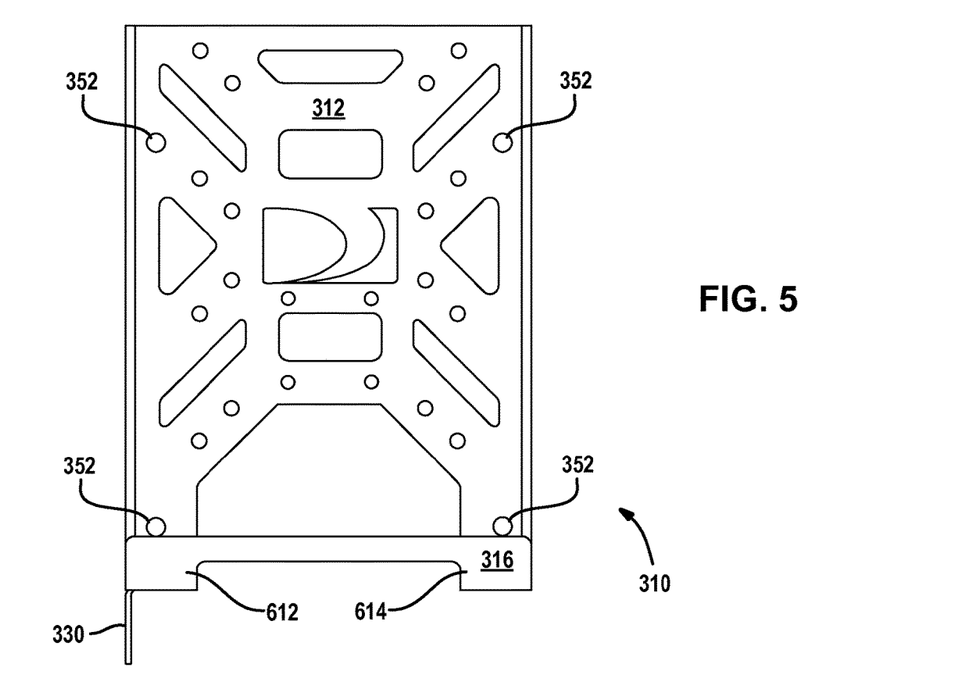
FIG. 5 is a front elevational view of the bracket of FIG. 3.

Referring now to FIG. 5, a front view of the mounting bracket 310 is illustrated. The retainer portion 316, as illustrated, extends laterally across the mounting bracket 310. The retainer may portion 316 may extend the same width as distance between the vertical edges of the back plate 312.

The fingers 612, 614 extend to form part of the receiving portion 316.

Referring now to FIGS. 6A and 6B, a top view and a bottom view of the mounting bracket 310 is illustrated. The two mounting extensions 340 are illustrated extending from the vertical edges of the second or back side 341 of the back plate 312. An opening 610 extends between fingers 612 that form the shelf portion 314. The opening 610 increases airflow around the user receiving device. Slots 616 also increase airflow.

Figure 7:
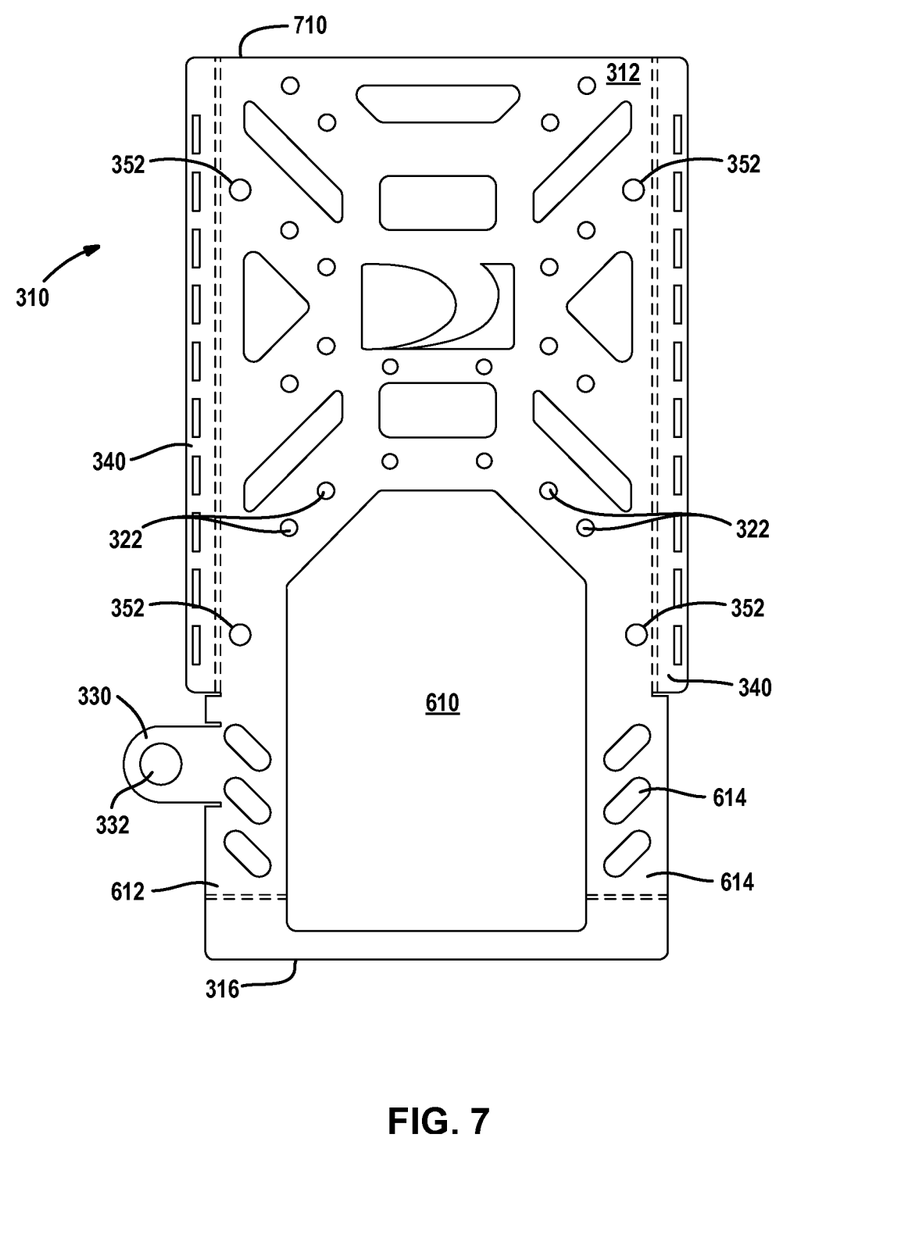
FIG. 7 is a stamped sheet for forming the bracket of FIG. 3.

Referring now to FIG. 7, the entire mounting bracket 310 may be formed from a single flat sheet 710 of metal. The dotted lines represent fold lines where the sheet is folded to form the various parts described above in FIG. 3-6B.

Figure 8:
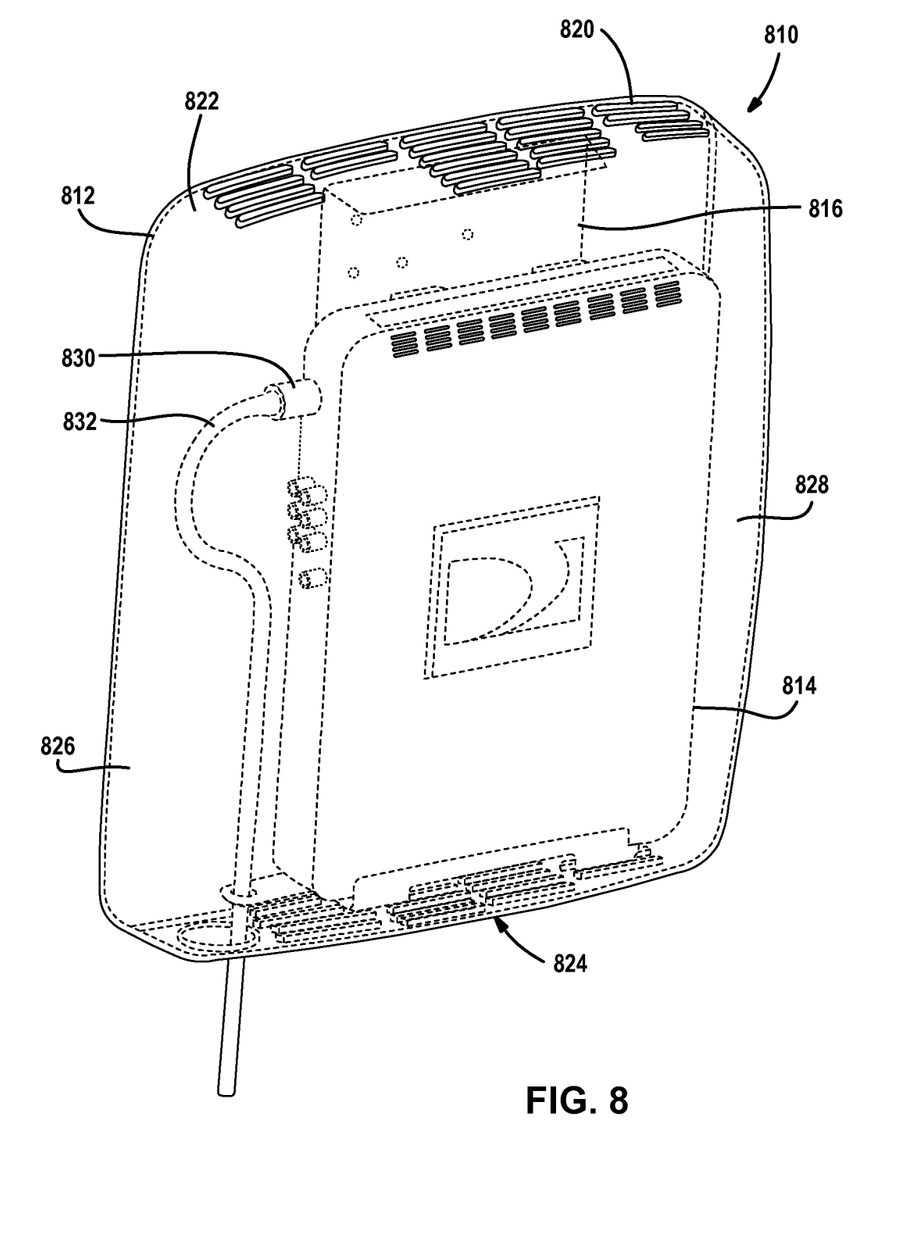
FIG. 8 is a perspective view of an enclosure assembly according to a second example of the disclosure.

Referring now to FIG. 8, a perspective view of a second example of a mounting assembly 810 is illustrated. The assembly 810 has an enclosure 812 coupled to a second example of a mounting bracket 816. The enclosure 812 may enclose a user receiving device 816 such as a set top box 814 and the mounting bracket 816. The enclosure 812 may include a plurality of ventilation openings 820 disposed thereon. In this example, the enclosure 812 has a top side 822 and a bottom side 824 that have ventilation openings 820. The enclosure may have vertical sides 826 on either side and extending between the top side 822 and bottom side 824. Another surface 828 may be generally parallel to the plane of the back plate of the bracket 816. Ornamentally, the surface may be curved or rounded. The enclosure 812 may be painted or colored to match the area to which it is mounted.

A connector 830 may be coupled to the user receiving device or set top box 814. A cable 832 coupled to the connector 830 is used for attachment to a display.

The user receiving device 814 may be configured to receive RF signals from a remote control. Infrared signals from a remote control may not easily reach the user receiving device due to the location of the enclosure or interference from the enclosure.

Figure 9A:
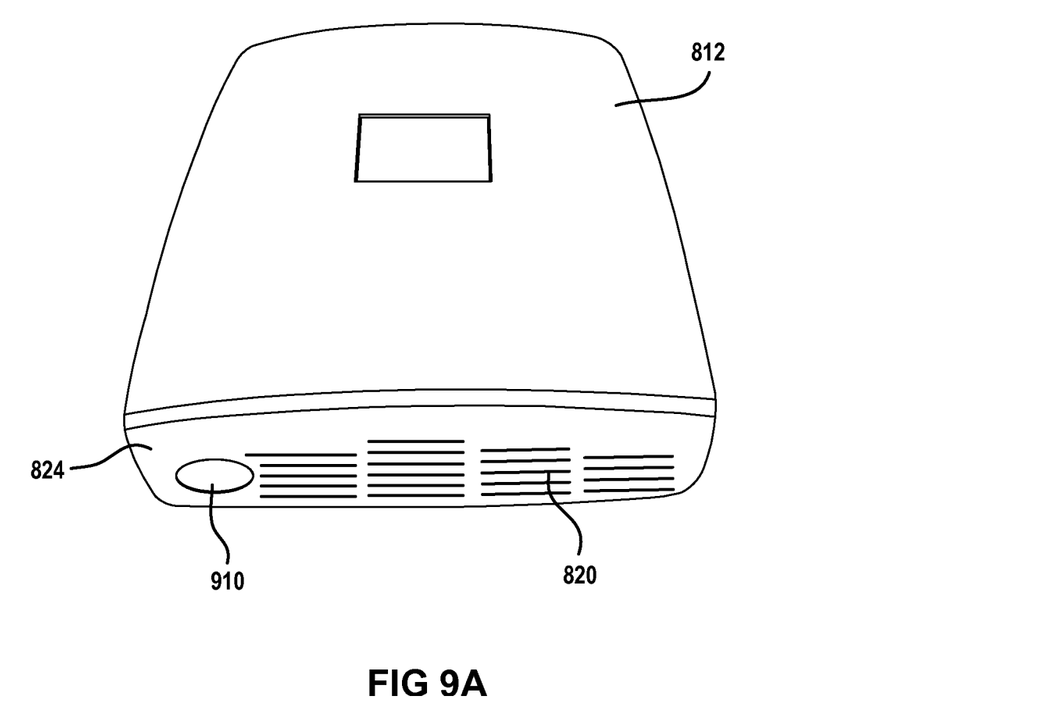
FIG. 9A is a perspective view of the outside enclosure cover of FIG. 8.

Referring now to FIG. 9A, the bottom side 824 of the enclosure 812 is illustrated having the ventilation openings 820 and a cable opening 910 so that a cable may extend therethrough for connecting the user receiving device 814 and a display for television.

Figure 9B:
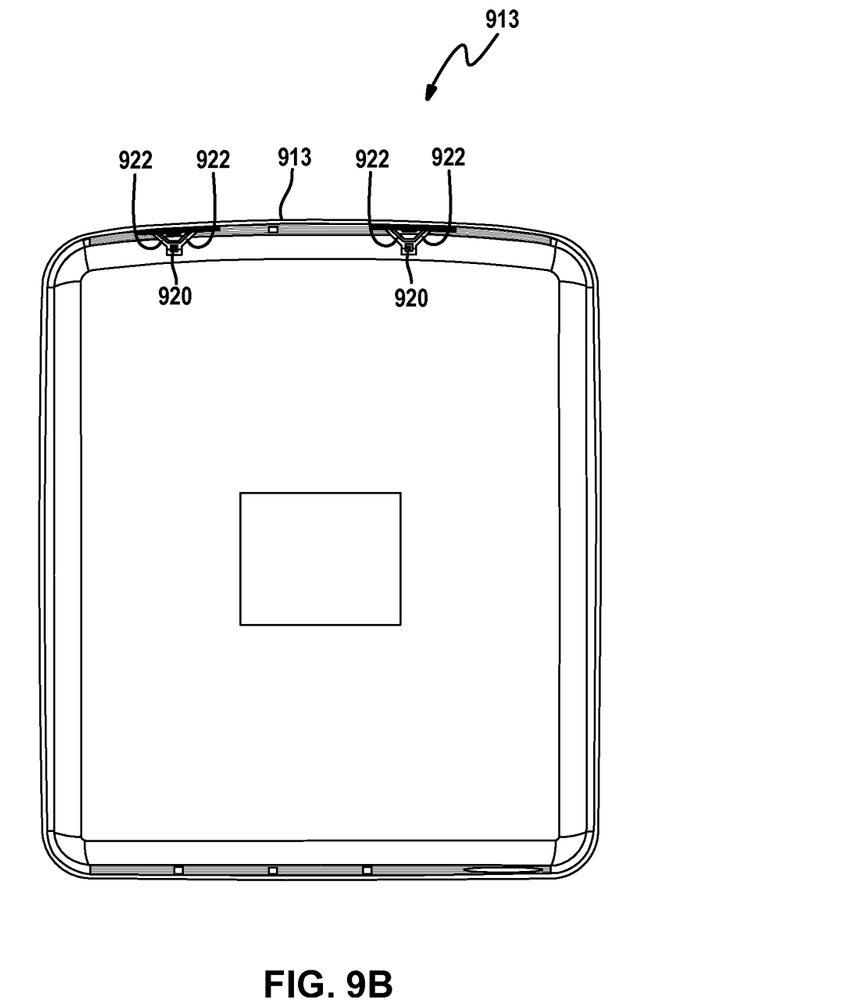
FIG. 9B is a perspective view of the inside enclosure cover of FIG. 8.

Referring now to FIG. 9B, a plurality of retainers 920 are illustrated within the enclosure 812. The retainers 920 may be internally molded with the enclosure 812. The retainers 920 may engage retainer openings in the mounting bracket 816 as will be described below. Extensions 922 may be used to position the retainers 920 a suitable distance from the bracket 816.

Figure 10:
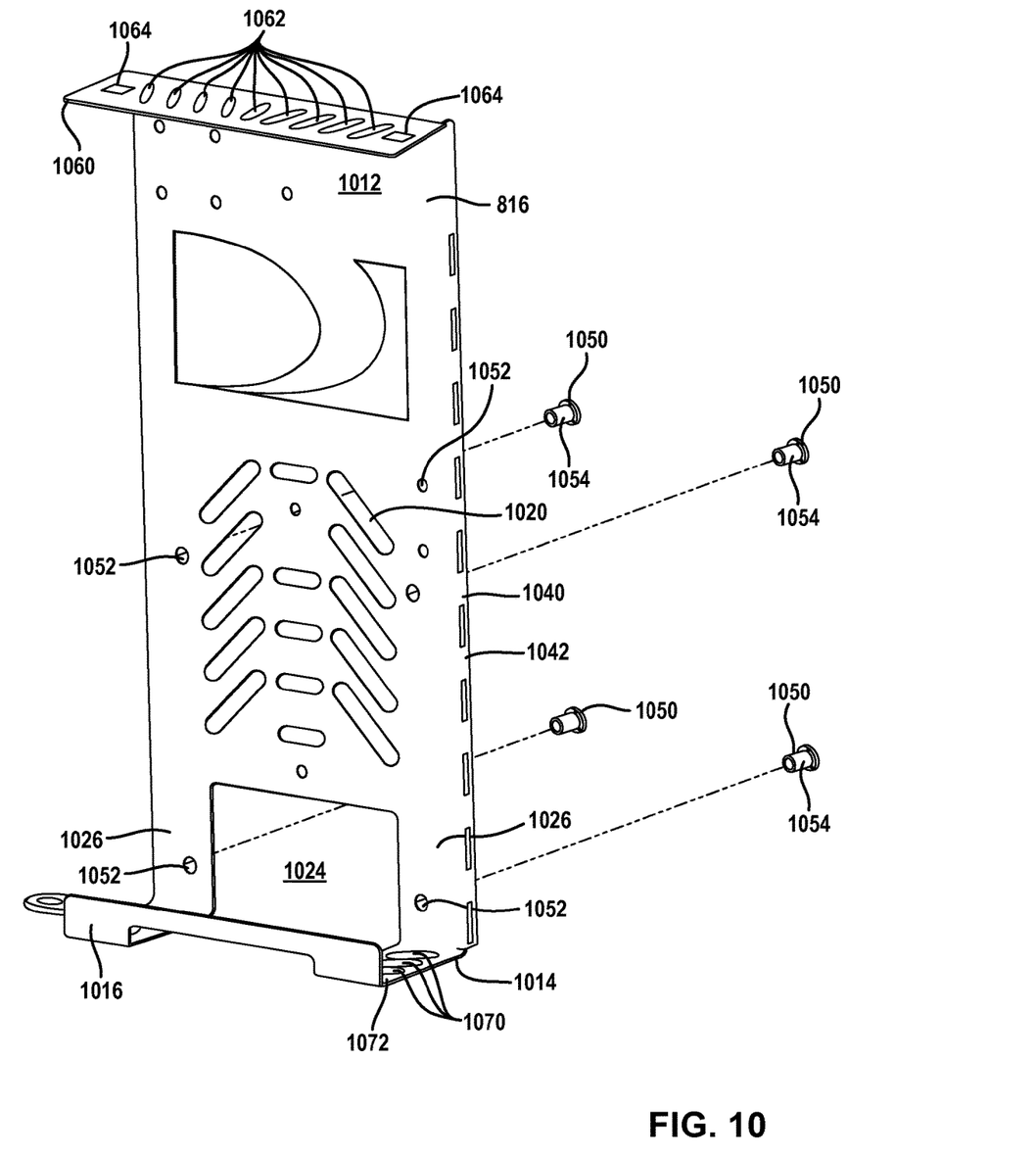
FIG. 10 is a perspective view of a second example of the bracket.

Referring now to FIG. 10, a perspective view of the second example of the mounting bracket 816 is illustrated. The mounting bracket 816 includes a back plate 1012, a shelf portion 1014, a retainer portion 1016 that are formed in a similar manner to that set forth in FIG. 3. That is, the shelf portion 1014 may be disposed in a plane perpendicular to the back plate 1012. The retainer portion 1016 may be parallel to the back plate 1012 and perpendicular to the shelf portion 1014. An opening 1024 defined by fingers 1026 are also formed in a similar manner to that set forth in FIGS. 3-7.

The back plate 1012 has a plurality of slots 1020 that may be disposed in a different pattern to that set forth above in FIG. 3. The slots 1020 may be disposed in predetermined locations to increase the airflow through the bracket 816.

A plurality of mounting extensions 1040 may also be formed on lateral edges of the back plate 1012. The mounting extensions 1040 have slots 1042 therethrough. The slots 1042 may be used to secure a strap or other type of fastener therethrough. This is illustrated best in FIG. 11.

Standoffs 1050 may extend through holes 1052 in the same manner described in the first example. The standoffs 1050 have heads for retaining the standoffs 1050 in the holes 1052.

An enclosure extension 1060 may extend in a direction outward from the back plate 1012. In this example, the enclosure extension 1060 extends in a direction perpendicular to the plane of the back plate 1012. In this example, the enclosure extension 1060 also includes a plurality of openings 1062. The openings 1062 may be slots. The openings 1062 may be used for ventilation. Retainer openings 1064 may be disposed in the extension 1060 to receive the retainers 920 illustrated in FIG. 9B. In this example, the retainer openings 1064 are secure. Other shapes may be used. The extension 1060 supports the enclosure 812 of FIG. 8.

Slots 1070 also may also be disposed on fingers 1072. The slots may allow for airflow therethrough.

Figure 11:
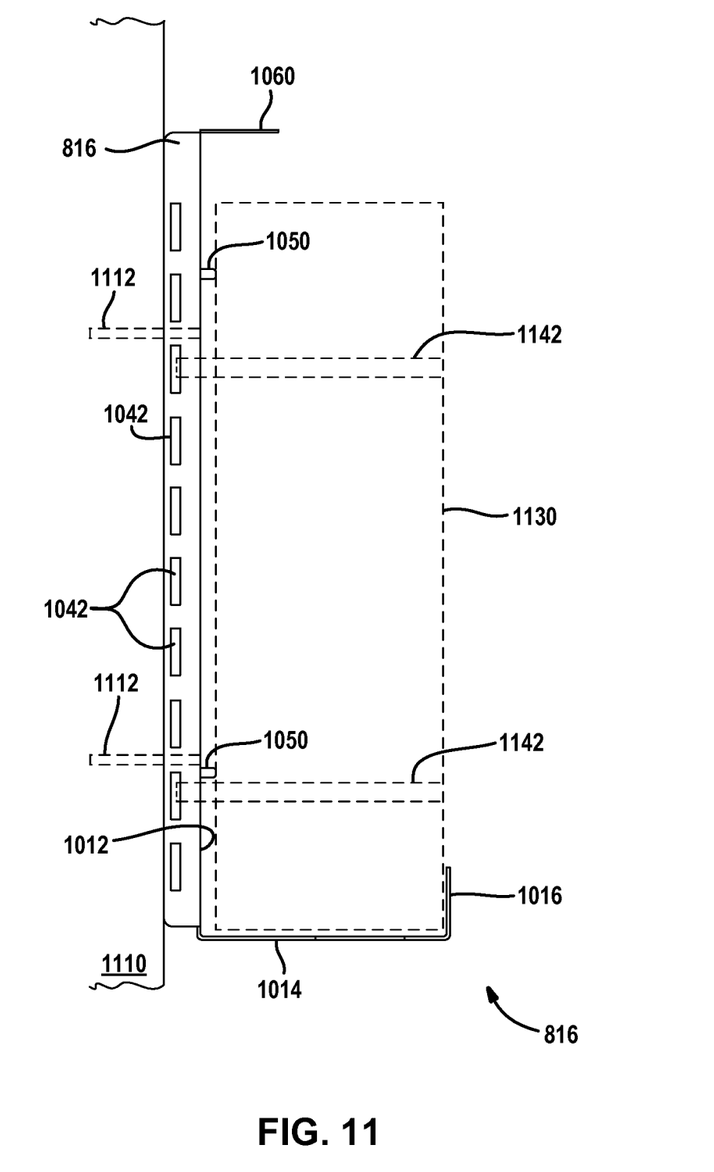
FIG. 11 is a side view of the bracket of FIG. 10.

Referring now to FIG. 11, a wall 1110, a portion of which is illustrated, has the mounting bracket 816 formed according to the second example secured thereto. The bracket 816 is mounted using fasteners 1112. The fasteners 1112 may be screws, nails or anchors. As in the previous example, the user receiving device 1130 is positioned by the standoffs 1050. The user receiving device 1130 rests against or near the shelf portion 1014 and is prevented from displacement away from the wall 1110 by the retainer portion 1016.

The mounting extensions 1040 position the back plate 1012 away from the wall 1110 so that airflow may cool the mounting bracket and the user receiving device 1130.

The slots 1042 may be used for wrapping a tie wrap or other fastener 1142 therethrough for securing the user receiving device 1130 to the bracket 816. Various numbers, shapes and sizes of slots 1042 may be used.

Figures 12, 14:
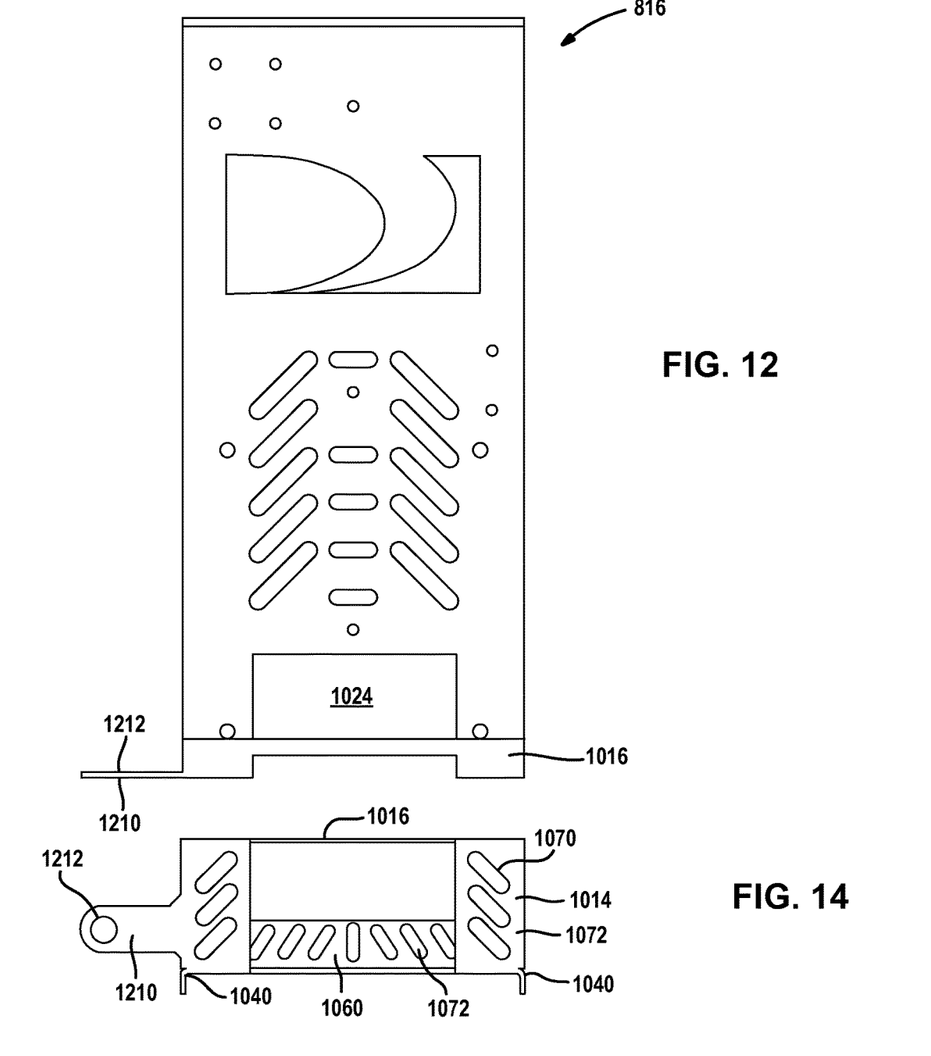
FIG. 12 is a front view of the bracket of FIG. 10.
FIG. 14 is a bottom view of the bracket of FIG. 10.
Figure 13:
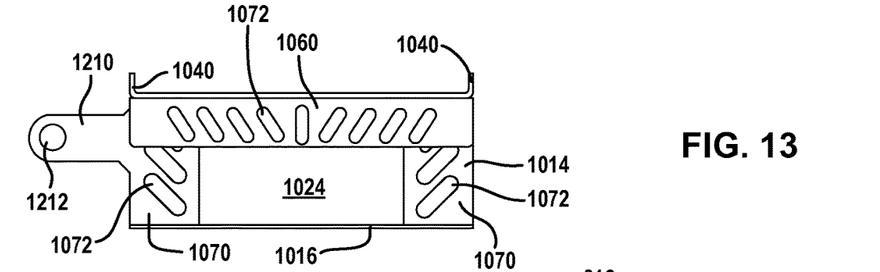
FIG. 13 is a top view of the bracket of FIG. 10.

Referring now to FIG. 12, the mounting bracket 816 also includes a cable retainer 1210. As is best illustrated in FIGS. 13 and 14, the cable retainer 1210 includes a hole 1212 extending therethrough. The cable retainer 1210 is sized to retain a cable for connecting the user receiving device 1130 to a display device such as a television. The hole 1212 may be smaller diameter than the connector 830. In this example, the enclosure extension 1060 is perpendicular to the back plate 1012 and is parallel to the shelf portion 1014. The enclosure extension 1060 may also be perpendicular to the plane of the retainer portion 1016.

Figure 15:
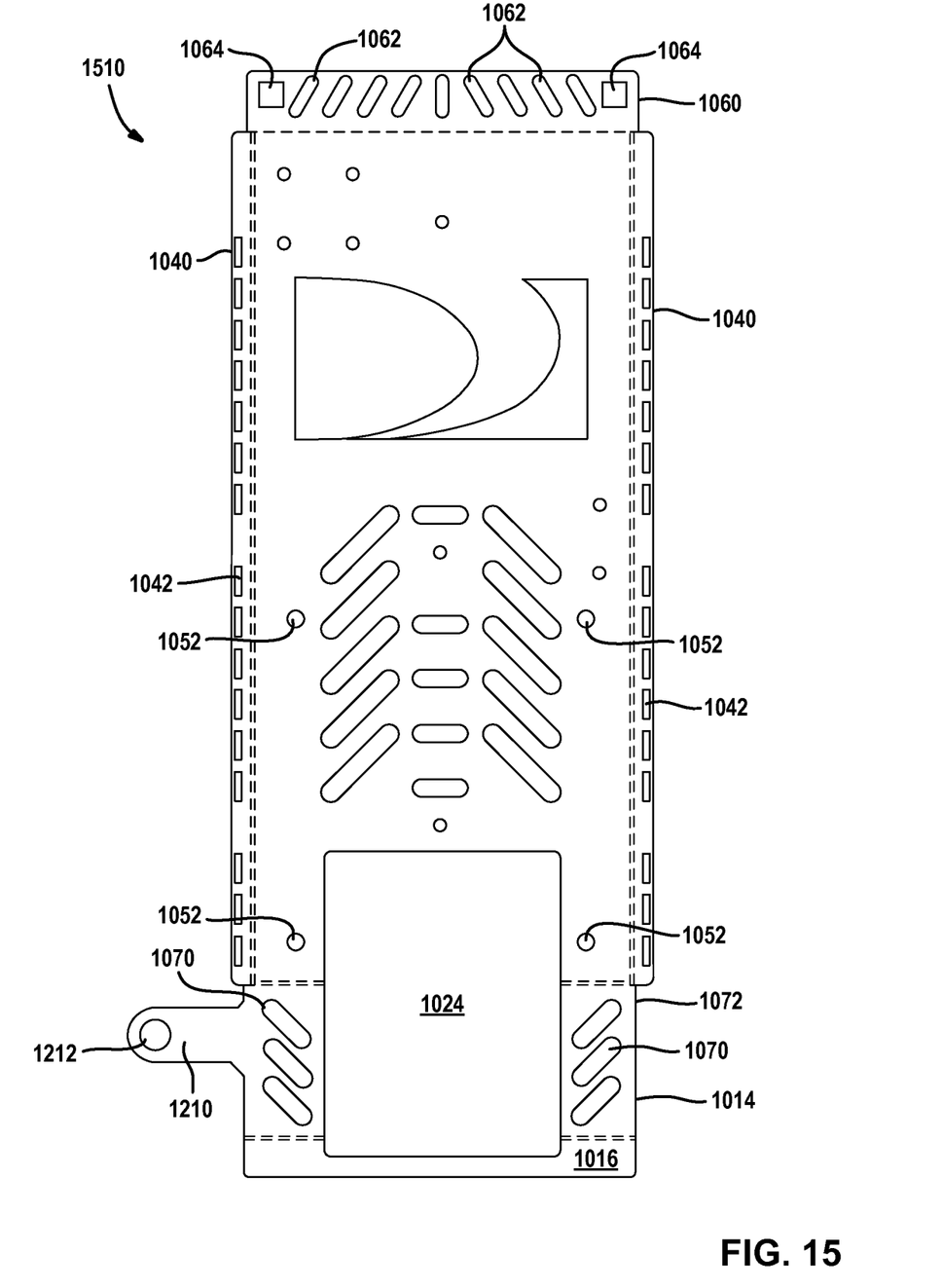
FIG. 15 is a view of a stamped sheet for forming the bracket of FIG. 10.

Referring now to FIG. 15, the mounting bracket 816 may be formed of a single sheet or plate 1510. The plate 1510 may be stamped from a singular sheet stock material. As mentioned above aluminum is one suitable material. As components of FIGS. 11-14 formed from the plate 1510 are illustrated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A mounting bracket mounting to a mounting surface for holding an electronic component, said electronic component coupled to a cable, said mounting bracket comprising:
   a vertically extending back plate having a first side and second side, said second side adjacent to the mounting surface;
   a horizontally extending shelf portion for holding the electronic component thereon and extending outward from the first side of the back plate, said shelf portion comprising a first shelf portion side and a second shelf portion side, said back plate disposed adjacent to the first shelf portion side;
   a vertically extending retainer portion extending from the shelf portion, said retainer portion disposed adjacent to the first shelf portion side; and
   a cable retainer extending from the shelf portion and comprising a hole therethrough for receiving the cable, wherein the cable extends through and is retained in the hole.

2. The mounting bracket as recited in claim 1 further comprising mounting extensions extending from the second side of the back plate for spacing the back plate from the mounting surface.

3. The mounting bracket as recited in claim 2 wherein the mounting extensions extend longitudinally.

4. The mounting bracket as recited in claim 3 wherein the mounting extensions extend along a first longitudinal edge of the second side of the back plate and a second longitudinal edge of the second side of the back plate.

5. The mounting bracket as recited in claim 3 further comprising a fastener and wherein the mounting extensions comprises openings for receiving the fastener for fastening a user receiving device to the mounting bracket.

6. The mounting bracket as recited in claim 1 wherein the shelf portion comprises a plurality of openings.

7. The mounting bracket as recited in claim 1 wherein the back plate comprises a plurality of holes in a Video Electronics Standard Association pattern.

8. The mounting bracket as recited in claim 1 wherein the first side of the back plate comprises a plurality of standoffs coupled thereto.

9. The mounting bracket as recited in claim 1 wherein the shelf portion is sized to receive a user receiving device.

10. The mounting bracket as recited in claim 1 wherein the cable retainer comprises an extension with a hole therethrough.

11. The mounting bracket as recited in claim 1 wherein the cable retainer is perpendicular to the shelf portion.

12. The mounting bracket as recited in claim 1 wherein the cable retainer is parallel to the shelf portion.

13. The mounting bracket as recited in claim 1 wherein the back plate comprises two fingers disposed on opposite vertical edges having an opening therebetween.

14. The mounting bracket as recited in claim 13 wherein the fingers extend from the back plate to form the shelf portion.

15. A mounting bracket mounting to a mounting surface for holding an electronic component, said electronic component coupled to a cable, said mounting bracket comprising:
- a vertically extending back plate having a first side and second side, said second side adjacent to the mounting surface;
- a horizontally extending shelf portion for holding the electronic component thereon and extending outward from the first side of the back plate, said shelf portion comprising a first shelf portion side and a second shelf portion side, said back plate disposed adjacent to the first shelf portion side;
- a vertically extending retainer portion extending from the shelf portion, said retainer portion disposed adjacent to the first shelf portion side;
- a cable retainer extending from the shelf portion and comprising a hole therethrough for receiving the cable; wherein the back plate comprises two fingers disposed on opposite vertical edges having an opening therebetween, said fingers are coupled to the retainer portion.

16. The mounting bracket as recited in claim 1 wherein the mounting surface comprises a wall.

17. The mounting bracket as recited in claim 1 wherein the mounting surface comprises a display.

18. An assembly comprising:
a mounting bracket as recited in claim 1;
said mounting bracket comprising an enclosure extension disposed along a lateral edge of the back plate; and
an enclosure enclosing the mounting bracket and coupled to the extension portion.

19. The assembly as recited in claim 18 wherein the enclosure comprises a plurality of retainers formed therein and wherein the enclosure extension comprises a plurality of openings for receiving a respective one of the plurality of retainers.

* * * * *